United States Patent [19]

Colucci

[11] Patent Number: 5,294,653
[45] Date of Patent: Mar. 15, 1994

[54] THREE-COMPONENT WATER-BASED VARNISH FOR GLASS FOR INTERIOR USE

[75] Inventor: Mauricio Colucci, Buenos Aires, Argentina

[73] Assignee: Oece Industrie Chimiche SpA, Cavezzo, Italy

[21] Appl. No.: 35,369

[22] Filed: Mar. 22, 1993

[30] Foreign Application Priority Data

Mar. 23, 1992 [IT] Italy .............................. MI92A000670

[51] Int. Cl.$^5$ .......................... C08K 5/15; C08K 5/38; C08L 83/00
[52] U.S. Cl. .................................. 524/114; 524/109; 524/413; 524/729; 524/751; 524/802; 524/838; 524/846; 428/429; 428/442
[58] Field of Search ................ 428/429, 442; 524/109, 524/114, 410, 729, 751, 802, 838, 846

[56] References Cited

U.S. PATENT DOCUMENTS

| | | | |
|---|---|---|---|
| 3,941,733 | 3/1976 | Chang | 529/838 |
| 4,412,035 | 10/1983 | Kurita | 524/838 |
| 4,889,768 | 12/1989 | Yokoshima et al. | 428/429 |
| 5,023,140 | 6/1991 | Glotfelter et al. | 428/429 |
| 5,041,494 | 8/1991 | Franke et al. | 524/838 |

*Primary Examiner*—Kriellion S. Morgan
*Attorney, Agent, or Firm*—Stevens, Davis, Miller & Mosher

[57] ABSTRACT

Water-based varnish for glass prepared by mixing, just before use, the following basic components:

component A: aqueous dispersion of an acrylic polymer containing hydroxy functional groups, component B: trialkoxysilane containing an epoxy functional group, component C: zirconium and ammonium double carbonate containing $ZrO_2$ ($+HfO_2$) (19% to 20% by wt.), in the form of an aqueous solution, components B and C in the mixture amounting to 3 and 2 parts by wt., respectively, per 100 parts by wt. of A.

4 Claims, No Drawings

THREE-COMPONENT WATER-BASED VARNISH FOR GLASS FOR INTERIOR USE

DESCRIPTION OF THE INVENTION

The water-based varnish according to the invention is prepared by mixing—just before use—an acrylic and urethane polymers aqueous dispersion (component A), an alkoxysilane containing at least one epoxy functional group (component B), and zirconium and ammonium double carbonate in the form of an aqueous solution (component C). The alkoxysilane containing an epoxy functional group is used to create a chemical bond between the silica present in glass and the ammonium ions of zirconium and ammonium carbonate. The carbonate can form bonds with the polymeric component containing free hydroxy groups (acrylic polymer with free OH groups), owing to the property of zirconium of forming complexes with zirconium coordinated hydroxy groups.

The hydroxy groups of the polymeric component can also react with the epoxy group of alkoxysilane, thus enhancing the reaction rate.

A fundamental property of the varnish composition according to the invention is that the polymeric film adheres to the glass substrate through real chemical bonds and not by a simple physical adhesion as is the case of the usual varnishes for glass.

The following schemes can be hypothesized for the various possible reactions and for the organometallic complexes that form. The implementation of the invention, however, is not limited to the said schemes.

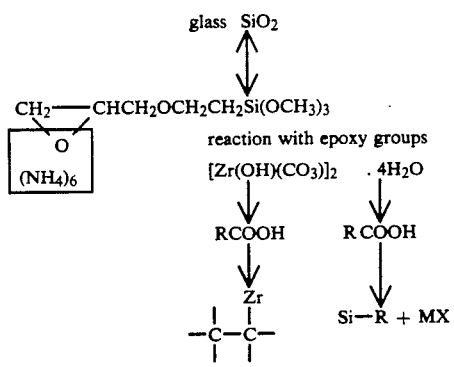

In this case, the chemical bond between glass and the zirconium and ammonium carbonate alkaline solution is represented by $OH^-$ ion, which plays the determinant role of reacting with the network and breaking the oxygen bridge bonds:

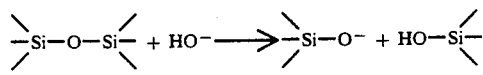

The breaking of the epoxy group with ammonium ions can be represented as follows:

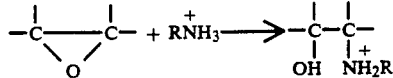

Varnish formulation

Component A consists of an aqueous dispersion of an acrylic polymer containing hydroxy functional groups (0.8 to 1.2 wt.-% OH groups on dry polymer basis), mixed with a lower amount of polyurethane resin produced from aliphatic polyisocyanate as well as with the usual additives of a varnish polymeric aqueous dispersion, e.g. surfactants, antifoam and thickening agents, pigments, special extenders for appearance improvement, etc. The dispersion viscosity can be adjusted, by addition of $H_2O$, to 40–60 sec. (Ford 4 viscosity at 20° C.).

The dispersion obtained contains acrylic resin (15% to 18% by wt.) and polyurethane resin (9% to 12% by wt.).

The typical formulation of component A is reported hereinbelow (% by weight).

| COMPONENT A | | % AS DRY PRODUCT |
| --- | --- | --- |
| Acrylic resin dispersion with free hydroxy groups | 53.577 | 28–32 |
| Aliphatic polyurethane resin dispersion | 30.388 | 32–36 |
| Polypropylene wax | 4.850 | 100 |
| Water | 3.250 | — |
| Polyurethane-based thickening agents | 0.856 | 48–52 |
| Preservatives | 0.001 | 10–12 |
| Silicone-based antifoam agents | 1.215 | 100 |
| Pigments | 4.758 | 34–50 |
| Glitter's | 1.105 | 100 |
| | 100.000% | |

Component B consists of a trialkoxysilane containing epoxy functional groups; particularly fit is gamma-glycidoxypropyltrimethoxysilane:

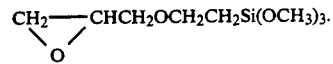

Component C consists of a commercially available 10 wt.-% aqueous solution of zirconium and ammonium double carbonate with a $ZrO_2(+HfO_2)$ content of 19% to 20% by weight.

Weight ratio among the three components

Components A, B, and C are mixed to obtain the varnish ready for use.

Component B, which is liquid, is used as is.

The components weight ratio is as follows:

| | |
| --- | --- |
| Component A | 100 parts by wt. |
| Component B | 3 parts by wt. |
| Component C | 2 parts by wt. |

The physicochemical properties of the varnish obtained are as follows:

| | |
|---|---|
| Density at 20° C. | 1.120 to 1.240 g/cm3 |
| Ford 4 viscosity at 20° C. | 40 to 60 sec. |
| Dry residue (2 hrs at 130° C.) | 35% to 45% by weight |
| Gelling time (time of use) at 20° C. | 240 to 280 hrs. |

Performance of the varnish according to the invention

The performance tests carried out on the varnish in actual use gave the results shown in the following table:

| GENERAL TESTS | STANDARDS | RESULTS |
|---|---|---|
| Adhesion | ISO-4624 | 0* |
| Light fastness (60 hrs) | ISO-2809 | 4/5 |
| Salt fog test (24 hrs) | UNI-5687 | S |
| Salt fog test (100 hrs) | UNI-5687 | S |
| Resistance to staining | BS-3962/4 | |
| Acetone | | 5 |
| Ethyl/Butyl acetate | | 5 |
| Tea | | 5 |
| Coffee | | 5 |
| Ethyl alcohol (96%) | | 4 |
| Ethyl alcohol (48%) | | 5 |
| Resistance to oil and grease | BS-3962/5 | 5 |
| Tables (lower surface): bearing points compression | | G** |

Note
In the estimates, marks from 1 to 5 are assigned to performance levels: 5 is the highest mark according to the specific standard.
*The results of adhesion tests are indicated as follows: N = negative, I = insufficient, S = sufficient, G = good, O = optimum.
**Velcro self-adhesive tapes are fastened to two panes, which are held together at a pressure of 2.5 kg/cm² for 7 days. The results obtained are indicated as under (*). This test simulates the stress undergone by the varnish at the glass panes bearing points.

APPLICATION PROPERTIES

On the basis of wide experimentation carried out in industrial plants producing usual solvent varnishes, the application properties of the water-based system as per this invention were found to be good. The coating film adhesiveness, performance and appearance were found to be excellent.

ADHESION

The tests showed an excellent adhesion to the panes produced by the main European manufacturers (see table illustrating the adhesion tests).

I claim:

1. Water-based varnish for glass obtained by mixing, just before use, the following essential components:

Component A: aqueous dispersion of acrylic polymer containing hydroxy functional groups (0.8 to 1.2 wt.-% on dry polymer basis), mixed with a lower amount of polyurethane resin produced from aliphatic polyisocyanate as well as with the conventional additives selected from: surfactants, antifoam and thickening agents, pigments, extenders, the acrylic polymer concentration ranging from 15% and 18% by weight of the total.

Component B: trialkoxysilane containing epoxy functional groups.

Component C: zirconium and ammonium double carbonate containing $ZrO_2(+HfO_2)$ (19% to 20% by weight) in the form of an aqueous solution, components B and C amounting to 3 and 2 parts by weight, respectively, per 100 parts by weight of component A.

2. Water-based varnish according to claim 1, wherein component A contains 9% to 12% by wt. of polyurethane resin of the total dispersion.

3. Water-based varnish according to claim 1, wherein the viscosity of component A is adjusted at 40 to 60 sec. (Ford 4 viscosity at 20° C.).

4. Water-based varnish according to claim 1, wherein component B is gamma-glycidoxypropyltrimethoxysilane.

* * * * *